April 27, 1937.　　　A. H. WOOD　　　2,078,887
ROTARY INTERNAL COMBUSTION ENGINE
Filed Nov. 8, 1935　　　4 Sheets-Sheet 2

Inventor
A. H. Wood

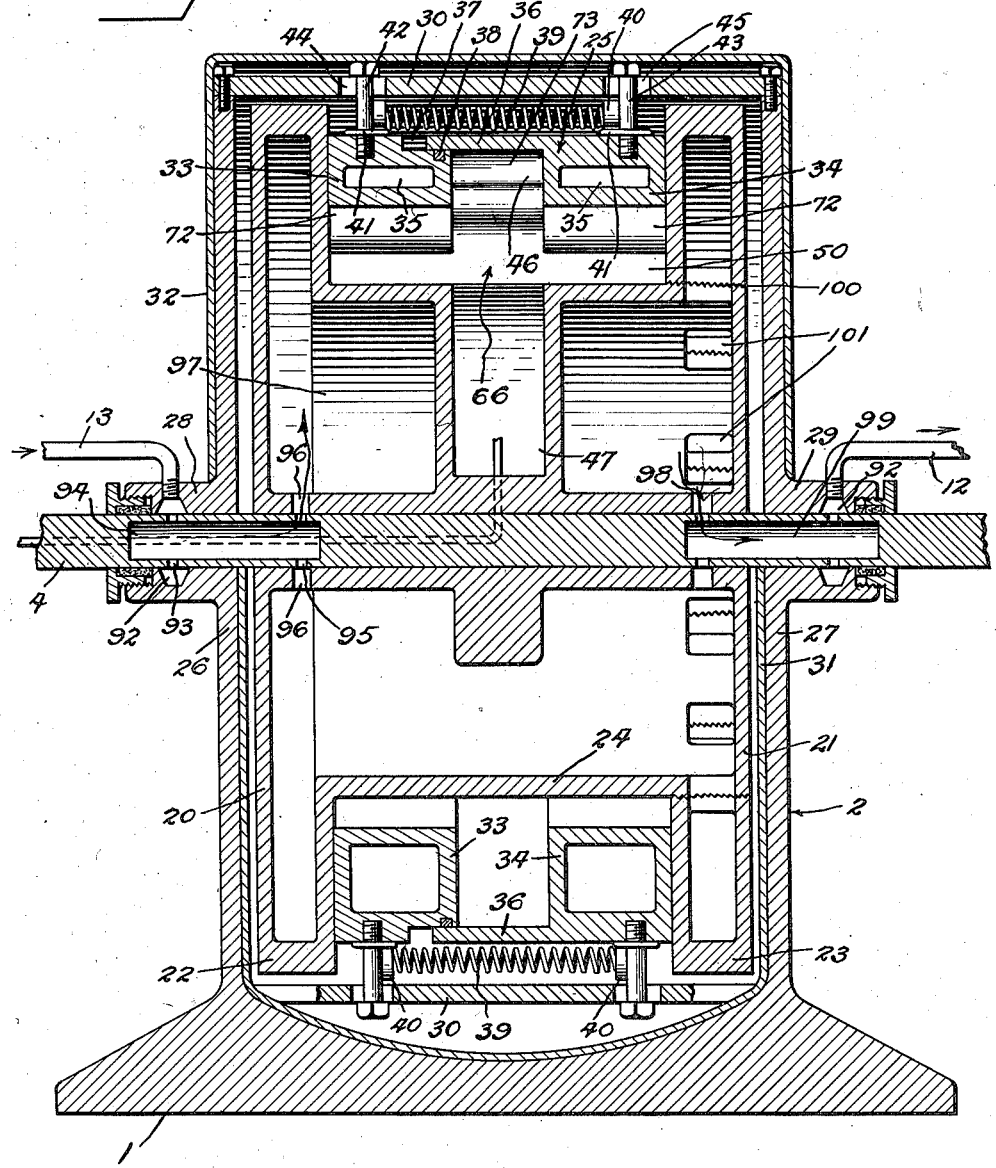

April 27, 1937. A. H. WOOD 2,078,887
ROTARY INTERNAL COMBUSTION ENGINE
Filed Nov. 8, 1935 4 Sheets-Sheet 4
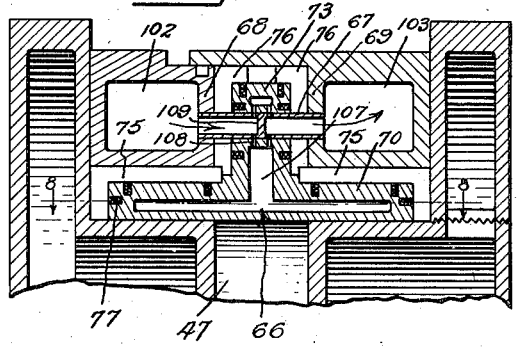
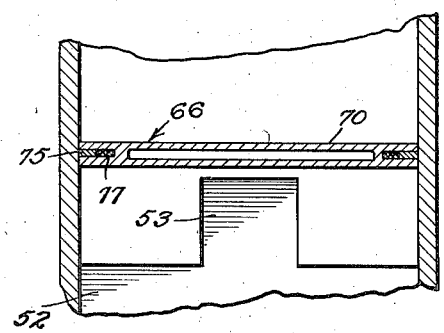
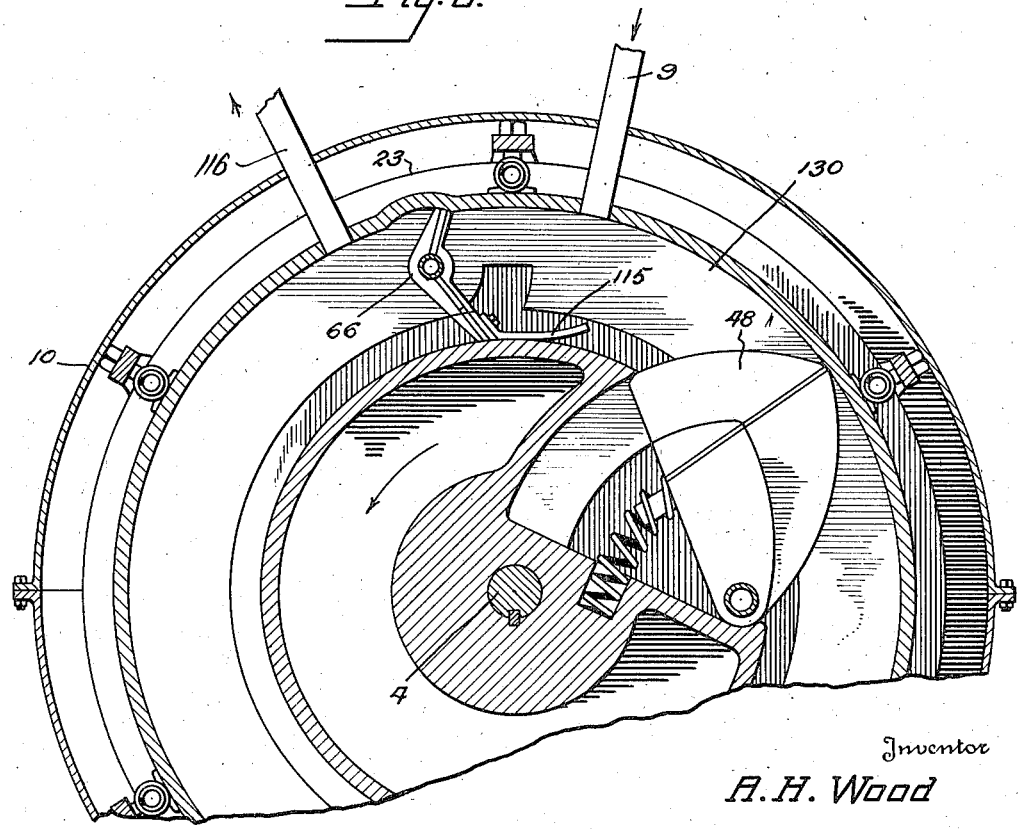
Inventor
A. H. Wood Patented Apr. 27, 1937

2,078,887

UNITED STATES PATENT OFFICE 2,078,887

ROTARY INTERNAL COMBUSTION ENGINE

Abram H. Wood, White Hall, Md.

Application November 8, 1935, Serial No. 48,931

10 Claims. (Cl. 123—17)

This invention relates to rotary internal combustion engines of the external combustion chamber swinging vane type.

One of the objects of the invention is to provide a multi-cylinder engine of the type indicated consisting of a plurality of units mounted co-axially and certain of which are adapted to be rendered inactive so that the power of the engine can be selectively adjusted to the magnitude of the load, thereby effecting economy in operation as well as minimizing wear of the parts.

Another object of the invention is the provision of a multi-unit rotary engine in which the units are essentially identical excepting that one or more of the units may be so modified as to permit it to function as a compressor for delivering combustible mixture under pressure to the working units.

Still another object of the invention is to provide a novel construction of internal combustion engine in which those units which may be cut out of operation, but still rotating with the shaft, have those elements which extend between the outer face of the rotor and the inner face of the stator for dividing the enclosed chamber into a working and exhaust space, withdrawable from contact with the circumferential bounding surfaces of said chambers so as to eliminate friction between the parts when the rotors of the cut-out units are revolving idly.

Still another object of the invention resides in a rotary internal combustion engine in which perfected sealing means is provided between the rotor and stator and between the abutments and the surfaces which they engage whereby a substantially leak-proof expansion chamber is provided.

A further object of the invention is to provide means for adequately cooling the engine.

Another object of the invention is the provision of mechanical scavenging means in the explosion chamber whereby to assure the taking in of a full and correctly proportioned charge of combustible mixture.

Other objects of the invention will appear as the following description of a preferred and practical embodiment of the invention proceeds.

In the drawings; throughout the several figures of which the same characters of reference have been employed to designate identical parts:

Figure 3 is a vertical section taken along the line 3—3 of Figure 2;

Figure 4 is a vertical section through the combustion chamber indicating the scavenging device;

Figure 5 is a section taken along the line 5—5 of Figure 2;

Figure 6 is a section taken along the line 6—6 of Figure 2;

Figure 7 is a section taken along the line 7—7 of Figure 2;

Figure 8 is a section taken along the line 8—8 of Figure 7; and

Figure 9 is a diametrical section, part being broken away illustrating one of the units modified to the extent necessary to permit it to act as a compressor.

Figure 1:
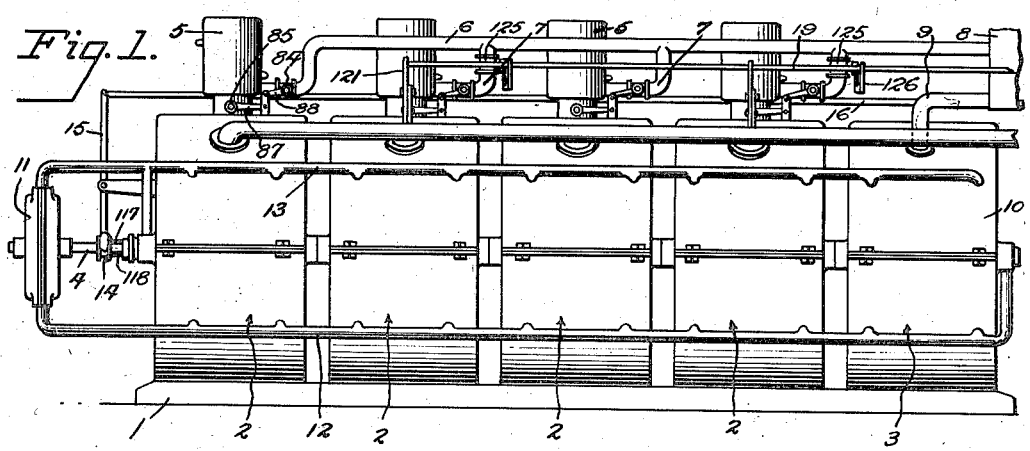
Figure 1 is a side elevation through an internal combustion engine consisting of several units constructed after the principles of the present invention, the storage tank for the combustible mixture under pressure being partly broken away.

Referring now in detail to the several figures and referring first to Figure 1, the numeral 1 represents a base supporting the several units 2, each of which as will presently appear contains a rotor and the associated structure necessary to constitute the unit an expansion cylinder excepting as will later be explained, one of the units, for example, the end unit 3 has the internal parts reversed and modified to the extent that it becomes a compression cylinder. The rotors of all of said units are mounted upon a common shaft 4.

Above each unit except the compressor is shown a shell or casing 5 supplied with combustible mixture by way of an intake manifold 6 having branches 7 individual to the casings 5. The manifold leads from a storage tank 8 receiving combustible mixture under pressure by way of the pipe 9 from the compressor 10. A water pump 11 is mounted upon the shaft 4 and by way of the water manifolds 12 and 13 it supplies cooling water to the several units. The shaft 4 has a slidable collar 14 worked by a lever 15 by means of an operating rod 16 extending to a point accessible to the operator of the engine.

Valves 84 and 85 control the admission of combustible mixture to the casing 5 and its intermittent admission to the expansion cylinders. Said valves work together in alternate phase by operating means such as the cam 129, that is to say, the valve 84 opens when the valve 85 shuts and vice versa.

Now, referring to Figures 2, 3, 5, 6 and 7, it will be observed that the rotor has the shape of a spool, with the outer faces 20 and 21 extending as flanges 22 and 23 beyond the middle or hub portion 24 of said rotor. The expansion chamber is formed in said rotor and between said flanges by the interposition of an annular stator member in general designated by the reference numeral 25.

The stator is built up of two standards 26 and 27 arising from the base 1 and carrying the bearings 28 and 29 which support the shaft 4. Said standards are bridged by a circumferential outer frame 30 which extends all around the rotor and spaced therefrom. An inner shell 31 lines the lower half of the chamber within the stator while the upper half of the stator is covered by a sheet metal casing 32 which extends across the top of the stator.

The outer bounding element of the stator consists of a pair of annular rings 33 and 34 cored out as at 35 to hold water, one ring having a relatively thin flange 36 extending laterally therefrom and seating in a rabbet 37 formed on the other ring. The two rings together form a sealing means for the chamber between the flanges of the rotor and they are efficiently packed against leakage. The joint between the flange 36 and the rabbet 37 is sealed by a ring 38.

The rings 33 and 34 are continuously biased outward against the cooperating faces of the rotor by means of a spiral spring 39. Said spring is suitably seated at its ends, by preference against cups 40 formed on the confronting faces of lugs 41 upstanding from the outer surface of the rotor. The rings 33 and 34 are suspended from the stator member 30 by means of bolts 42 and 43 which pass through lateral slots 44 and 45 giving the rings 33 and 34 freedom of lateral play so that they will always engage the adjacent faces of the rotor under the pressure of the spring 39. On account of the necessity of the rings affording the path of travel for the upward part of the vane carried by the rotor, they are so constructed as to provide an intermediate channel 46 of which the flange 36 forms the outer bounding wall.

Figure 2:
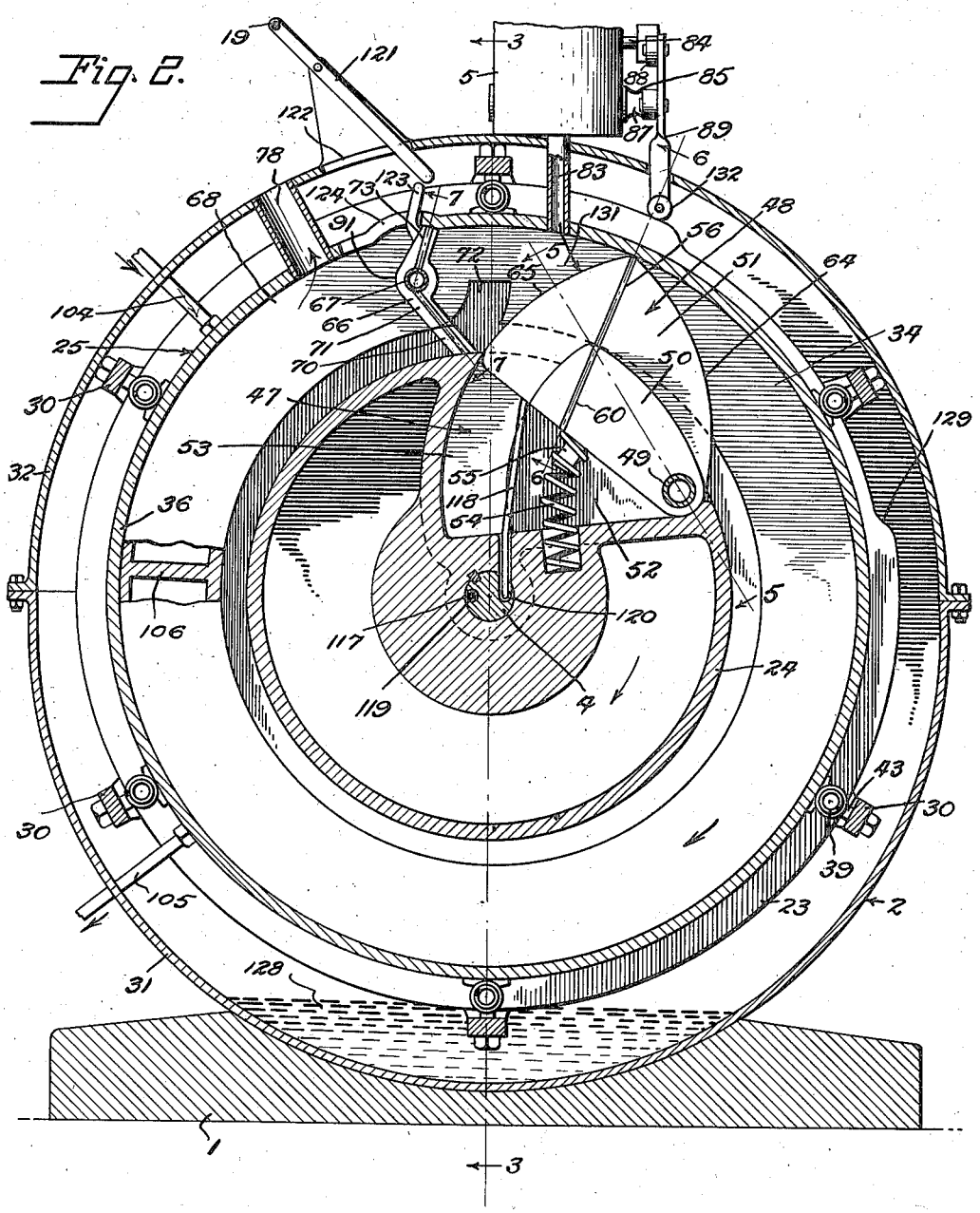
Figure 2 is a diametrical cross section through one of the working units.

Referring to Figure 2, it will be seen that the hub portion 24 of the rotor has a recess 47 capable of receiving the vane 48 which is pivoted at 49 to said hub portion adjacent its periphery. The vane is of two thicknesses, the part 50 being wide and extending from side to side of the expansion chamber while the part 51 is narrow and is adapted to ride in the channel 46 which is of restricted width. Figures 2 and 8 show clearly that the recess 47 in the hub portion of the rotor is of corresponding two widths, the part 52 being wide to receive the wider part of the vane and the part 53 being narrow to receive the relatively narrow part of the vane. The vane is pressed out against the bounding circumferential surface of the stator by means of a spring 54, one of which is suitably seated in the hub of said rotor while the other engages the under-surface of vane 48 through any suitable instrumentality such as the boss 55 which extends into the hollow of said spring. Figure 2 shows the vane in its fully extended position. It is obvious that efficient operation of the rotary engine requires that the outer or relatively narrow part of the vane 48 be sealed against the top and side walls of the channel 46 and that the inner or wider part of the abutment be sealed against the upper walls and sides of the side portion of the expansion chamber.

Figure 6 shows the sealing arrangement. The narrow part 51 of the vane which extends up into the channel 46 has a groove 56 around its side and top faces and two inverted L-shaped packing elements 58 and 57 seated in said grooves. The upper limbs of said sealing elements overlap. Little springs 59 suitably seated in bores in the outer portion 51 press both upwardly and laterally against the inverted L-shaped sealing means biasing them outward into sealing engagement with the adjacent walls of the channel 46. The wider portion 50 of the vane is likewise provided with a groove 60 extending along its sides and across its top as far as the bottoms of the grooves in the sides of the narrow part of the vane, and in the grooves 60 are located the L-shaped sealing means 61 and 62 which are pressed upward and outward by underlying small springs 63.

The advance face 64 of the vane 48 has the curvature of the hub portion 24 so that when the vane is fully housed in the recess 47, said surface conforms to the cylindrical contour of the hub. The posterior surface 65 of the vane has the same curvature as the cooperating wall of the recess 47 and fits said recess freely, but closely so as to prevent an accumulation of carbon, etc., in said recess. The annular rings 33 and 34 Figure 7 support an abutment 66 pivoted on an axis consisting of a pin 67 secured in the inner walls 68 and 69 of said rings and which walls form the sides of the channel 46. The abutment 66 has a wide lower portion 70 the full width of the expansion chamber and a narrow portion 71 fitting in the channel 46. The abutment 66 normally engages the cylindrical surface of the hub portion 24, but at times, as will appear, it is elevated to the extent that it will not extend into the wide part of the expansion chamber. To permit it to be thus elevated, the annular rings 33 and 34 are provided with recesses 72 into which the wide portion of the abutment 66 enters when the abutment is raised. The abutment is provided with an upward extension 73 which makes contact with the flange 36, said flange at the point of contact being circular with the axis of the pin 67 as its center.

The space between the face 65 of the vane 48 and the abutment 66 forms the admission chamber for the gases under high pressure resulting from the explosion in the cylinder 74 within the casing 5. The vane 48 is the piston which moves the rotor under the expansive pressure of the gases while the abutment 66 forms a stationary wall against which the expanding gases react and it at the same time prevents the gases under pressure leaking back on the exhaust side of the expansion chamber. The lower portion 71 of the abutment 66 is longer than the upper extension 73 so that the effect of pressure in the chamber between the vane and abutment is to force the abutment 66 down into close frictional contact with the hub 24 of the rotor. The sides, top and bottom of the abutment 66 are provided with grooves 74' in which sealing rings 75 and 76 which are biased outwardly against the surfaces which they engage by small backing springs 77 housed in the abutment.

It will be observed from Figure 2 that the radial width of the expansion chamber is greater adjacent the admission chamber than at the opposite side thereof. The purpose of this is to retard the pressure drop of the expanding gases until near the exhaust port 78 so that practically the entire rotary stroke of the vane 48 is a working stroke.

Before describing the action of the abutment 66 and vane 48 under working conditions, attention is directed to Figures 1, 2 and 4 which disclose the mechanism of the combustion chamber. Figure 4 shows that the casing 5 is double walled, the inner wall constituting a cylinder 74 and in the cylinder is a piston 79 which is normally advanced against a fixed ring or collar 80 by means of a spring 81. Beneath the piston 79 is a combustion chamber 82 with which the branches 7 of the intake manifold communicate, and having a transfer passage 83 opening into the intake chamber between the vane 48 and abutment 66. The branch 7 and the transfer passage 83 are respectively controlled by the valves 84 and 85, and a spark plug 86 operates in the explosion chamber. The valves 84 and 85 are so connected that when one opens, the other closes and vice versa. The linkage between said valves may be as shown in Figures 1 and 2, in which the valves are operated by oppositely disposed levers 87 and 88 actuated by a vertically reciprocable link 89, see Figure 2, the lower end of which may carry an anti-friction roller 132 which bears against a cam surface 129 formed on the edge of one of the rotor flanges. The branch 7 of the intake manifold is also provided with a check valve 90 which closes against the pressure developed in the combustion chamber.

In operation, combustible mixture within the tank 8 is always available at each of the valves 84 and when the valve 84 shown in Figure 4 opens the combustible mixture under pressure fills the combustion chamber 82, pushing back the piston 79 against the tension of the spring 81.

At the moment pressure conditions in the combustion chamber become static, and as the intake valve 84 begins to close, the compressed mixture is ignited, instantly developing a pressure which throws the piston 79 back against the tension of the spring 81 and also discharges through the valve 85, controlling the transfer passage 83 which is at this time in its open phase. The check valve 90 is to prevent flame propagation through the valve 84 before the latter has entirely closed. After the peak of explosion pressure, the piston 79 advances, pushing out the burned gases and thus effectively scavenging the combustion chamber.

Now, turning to Figure 2, it will be understood that when the gases under pressure enter the chamber between the vane 48 and abutment 66, the pressure holds the latter abutment firmly to its seat against the hub of the rotor and against the ceiling of the expansion chamber and that the motive function of the expansion is expended against the face 65 of the vane 48. Since the pivotal connection of the vane 48 with the rotor is closer to the center of the rotor than the middle of the face 65, the pressure within the chamber between the abutment 66 and vane 48 has the effect of forcing the vane 48 outward into intimate contact with the outer wall of the expansion chamber. The vane and rotor move in the direction of the arrow shown in Figure 2, the vane settling slightly into the recess 47 as the width of the expansion chamber becomes narrower as the vane approaches a position diametrically opposite the admission chamber. Then the vane moves out slightly under the urge of the spring 54 as the width of the combustion chamber becomes slightly wider. Finally, the vane rides over the exhaust port 78 opening said port to the expansion chamber and permitting the exit of the expanded gases.

The sloping advance face 64 of the vane 48 then collides with the nose 91 on the rear face of the abutment 66 which causes the vane 48 to lower itself into the recess 47 sufficiently for its apex to pass beneath the pivotal connection of the abutment 66. The vane 48 has meanwhile engaged the abutment 66 below the nose 91 and has tilted it upward so that the wide part of the abutment 66 has entered the recesses 72. Thus in passing one another the vane 48 descends into the recess 47 and the abutment 66 ascends into the recess 72, each yielding to the other and permitting a smooth passage.

The above description represents one working cycle of the rotor which is repeated just as soon as the parts re-assume the relative positions shown in Figure 2.

Great care has been taken to prevent undue heating of any of those parts of the engine which might warp or stick when overheated and thus interfere with the proper functioning of the engine. With this purpose in view, a circulation of cooling water has been assured into all those organs of the engine which have come into adjacency to the hot products of combustion. Figure 3 shows that water from the water manifold 13 has entered an annular channel 92 in the left hand bearing boss and that the shaft in that zone which rotates in said channel has a series of holes 93 communicating with said channel and through which water enters into a bore 94 of said shaft. Said bore has apertures 95 extending through the shaft and which register with ports 96 leading to a water space 97 within the hub and flanges of the rotor. The walls of the rotor are thus cooled by positive circulation, the water exiting through ports 98 into the posterior bored portion 99 of the shaft the water leaving by way of a channel 92 in communication with the water outlet manifold 12.

Since the flange 23 is necessarily separate from the rest of the rotor in order to permit the mounting of the rings, abutment, etc., and is screwed on as indicated at 100, the hub is provided with a plurality of water spaces 101 communicating with the water chamber of the removable flange.

Now, referring to the cooling of the rings 33 and 34, they are provided with water spaces 102 and 103, see Figures 6 and 7, which receive water through a pipe 104, Figure 2, and discharge it by way of a pipe 105, there being preferably a baffle 106 between said pipes to insure that the circulating water will traverse the entire circumferential circuit of said last mentioned water spaces.

Figure 7 shows that the upper abutment 66 is cooled through the pin 67 which is hollow and communicates with the space 107 within the abutment by means of ports 108. In order to assure circulation through the abutment the pin has an intermediate partition 109 blocking passage of water through the bore.

The lower vane 48 is similarly cooled by the circulation of water, see Figure 5, which enters from the water space 97 within the stator through a bore 110 in the pivot pin 49 and which flows through ports 111 in said pin which align themselves with ports 112' in the oscillation of said vane, the last named ports communicate with the interior water chamber 112' within the vane. The water exits from the vane through a discharge passage similarly provided at the opposite side of the pivot pin. The intermediate portion of the pivot pin is preferably imperforate.

The combustion chambers are, of course, water jacketed as clearly shown in Figure 4 in which the cooling water is indicated as entering by way of a pipe 113 and leaving through an outlet 114.

Referring now to Figures 1 and 9, it will be understood from the former that a four-unit interval combustion engine is shown with the additional unit 103, the latter being a compressor. It is so mounted upon the shaft 4 that the rotor within said compressor travels in an opposite direction phase from the power units 2. In Figure 9, for example, the arrow shows direction of the rotation of the compressor from which it will be understood that the vane 48 meets the abutment 66 in a direction opposite to that in which these parts engage in the expansion units. In view of the fact that the lower portion of the abutment 66 would make an obtuse angle with the oncoming face of the vane 48, it is necessary to provide means such as the shoe 115 on the leading edge of the abutment 66 so that the said abutment will be raised and not jammed when it is contacted by the vane 48. This is the only feature of structural distinction between the compressor unit and the expansion units, which is a decided advantage from a standpoint of economy in manufacture, since all units may be constructed alike with the simple difference that a shoe is added to the abutment 66 in the compressor.

The pipe 9 is in a similar position as the pipe 83 associated with the expansion units but through the reverse rotation of the compressor ports it becomes an outlet conduit and conducts the combustible mixture to the tank 8 from which it is supplied to the several combustion chambers as has been described. Combustible mixture from a suitable carbureting device not shown is supplied to the compressor through a pipe 116.

The fact that this is a rotary combustion engine makes it possible in the interest of economy of operation to render certain of the power units inactive at will, according to the load demands of the engine, and without disturbing static balance of the motor. In traveling upon a level surface, it is proposed to cut out certain of the power units and to put these into operation again when the load increases, as for example, coming up hill. With this object in view, the motor as illustrated is provided with the sliding collar 14 on the shaft 4, the lever 15, and the pull rod 16. Cables 117 and 118 are secured to the collar 14 and pass through perforations 119 and 120 in said shaft, which are shown in Figure 2. The cables are secured to the rotor vane in alternate expansion units so that these vanes can be simultaneously pulled down into the recesses 47 and render units with which they are associated inoperative. Figure 2 shows one of these cables 118 attached to the vane.

In order to reduce to a minimum the wear and tear on the parts of those units which are designed to be cut out, means are provided for lifting the abutments 66 so that they are entirely withdrawn from the expansion chamber. Said means comprises a pivoted lever 121, see Figure 2, which passes through a slot 122 in the casing of the stator and engages a lug 123 which is fastened to the upper part of the abutment 66 and passes through a slot 124 in the flange 36 of the ring 34. There is a lever 121 for each of the units which is designed to be cut out, and a common operating rod 19 swingable parallel to itself above the axis of the levers 121 by any suitable mechanism not shown. When the levers 121 are actuated simultaneously with the cables 117 and 118, both the abutment 66 and vane 48 are drawn entirely out of the expansion space and consequently, although the rotor continues to rotate, the body of air or gas within the expansion space is not acted upon by any of the mechanism of the unit so that the inactive units impose no drag upon those units which are operating, except, of course, such negligible energy as may be absorbed in the friction of the bearings.

Since the combustible mixture within the tank 4 is always under pressure and is not directly communicated with the combustion chambers of the cut-out units whenever the intake valves 84 of the active units open, since all of the valves 84 are simultaneously operated, it is thought advisable, if not necessary to provide auxiliary valves 125. In the branches 7 of the intake manifold of those units, which are designed to be cut out, which auxiliary valves while normally opened can be closed whenever the said units are cut out and thus preclude the wasting of compressed mixture in the cut out units. The auxiliary valves 125 which in Figure 1 are shown in connection with the second and fourth expansion units are suitably operated by linkage 126 which may be connected to the operating rod 19 as shown in Figure 1.

The several units are preferably enclosed in oil-tight cases 31 which may carry a suitable body of oil 128 in the sump or lower portion into which the valve operation cam 129 may dip and thus carry oil up to the adjacent ends of the normal valve operating mechanism.

In operation, the vane 48 in the compressor shown in Figure 9 compresses combustible mixture in the space 130 between the abutment 66 and vane 48 and drives it out of the pipes 9 into the tank 8. In the expansion units the compressed gas having been exploded in the combustion chamber 4 and admitted to the space 131, Figure 2, between the abutment 66 and vane 48, expands as has been described, rotating the vane 48 and with it the entire rotor, the residual gaseous products which are in advance of the vane 48 being forced out of the port 78. When certain of the units are cut off, there is no explosion in the associated combustion chambers since the supply of mixture has been withheld by the actuation of the auxiliary valves 125.

While I have, in the above description, disclosed what I believe to be a perfect and practical embodiment of the inventive concept, it will be understood to those skilled in the art that the details of construction and the arrangement of parts are only by way of example and not to be construed as limiting the scope of the invention as defined in the appended claims.

What I claim is:

1. Rotary internal combustion engine comprising a stator and a rotor, including extending side flanges in planes perpendicular to the rotor axis, one of said flanges having a peripheral cam surface, said stator and rotor including between them means for defining an expansion chamber having a movable wall thereof carried by said rotor for rotating the latter, means forming a combustion chamber communicating with said expansion chamber, inlet and outlet valves for said combustion chamber one controlling an inlet passage for combustible mixture, the other controlling communication between said combustion chamber and said expansion chamber said valves opening and closing in alternation, means for simultaneously operating said valves including reciprocable element engaging said cam surface and controlled thereby.

2. Rotary internal combustion engine comprising a stator, and a rotor including extending side flanges in planes perpendicular to the rotor axis, a casing enclosing said stator and rotor including a frame bridging the peripheral space between side flanges, said stator including a pair of peripheral rings one slidably fitting within the other with a gas sealed joint and being expansible laterally against said flanges, at least one of said rings being recessed to form a channel between the adjacent faces of said rings, means for supporting said rings from said frame with freedom of lateral expansion, said rotor having a hub portion encompassed by said rings and forming with them an expansion chamber, a vane carried by said rotor having a narrow portion fitting within said channel and a wide portion fitting against said side flanges below said channel, an abutment carried by said stator and means for admitting fluid under explosion pressure to that part of the expansion chamber between said abutment and said vane at a point adjacent to said fixed abutment.

3. Rotary internal combustion engine as claimed in claim 2, said abutment being pivotedly mounted in said rings and having a narrow portion fitting the channel between said rings and a wide portion fitting the portion of said expansion chamber inwardly said rings.

4. Rotary internal combustion engine having as claimed in claim 2, the hub portion of said rotor having a recess with narrow and wide portions corresponding in width to similar portions of said vane for snugly receiving the latter, and said abutment being pivoted in said rings, having a narrow portion fitting in the channel between said rings and a wide portion fitting that part of the expansion chamber inwardly of said rings, said abutment and said vane mutually yielding upon engagement to permit passage of the abutment by the vane, said rings having a recess for receiving the wide portion of said abutment when it is tilted by said vane.

5. Rotary internal combustion engine as claimed in claim 2, the outer cylindrical surface of the expansion chamber constituted by the inner surface of said rings being slightly eccentric with respect to the rotor shaft whereby the cross section of said expansion chamber is restricted to a point at least 180 degrees from the point of admission of fluid of explosion pressure, thereby prolonging the power stroke through substantially the entire circumference of expansion chamber.

6. Rotary internal combustion engine as claimed in claim 2, including springs arranged transversally of said stator externally of said rings and held in compression by said rings for biasing said rings against the sides of flanges of said rotor.

7. Rotary internal combustion engine comprising a shaft, expansion units co-axial with said shaft and each including a stator and each unit having side plates constituting bearings for said shaft and a rotor for each unit fixed to said shaft, each rotor including extending side flanges in planes perpendicular to the rotor axis, said stator including a frame bridging the peripheral space between the side plates of said stator and a pair of peripheral rings one slidably fitting within the other with a gas sealed joint and being expansible laterally against said flanges, at least one of said rings being recessed to form a channel between the adjacent faces of said rings, means of supporting said rings from said frame with freedom of lateral expansion, said rotor having a hub portion encompassed by said rings and forming with them an expansion chamber, a vane carried by said rotor having a narrow portion fitting within said channel and a wide portion fitting against said side flanges below said channel, an abutment carried by said stator and means for admitting fluid under explosion pressure to that part of expansion chamber between said abutment and said vane at a point adjacent to said abutment, means for rendering alternate units inactive by withdrawing the abutment and vane from cooperative relationship with the circumferential walls of their respective expansion chamber.

8. Rotary internal combustion engine as claimed in claim 7 including a means forming a combustion chamber for each expansion unit, a tank for supplying combustible mixture under pressure to said combustion chambers, valves controlling the normal admission of combustible mixture to said combustion chambers and from said chambers to said expansion units, and a compressor unit on said shaft for delivering combustible mixture under pressure to said tank said compression unit being substantially similar to an expansion unit but said rotor being arranged in reverse relation on said shaft, including a means on said abutment for overriding the vane which rotates with the rotor, including auxiliary valves in the intake branches of the expansion unit which are arranged to be cut out and operable to cross said passages when said expansion units are rendered inoperative.

9. Rotary engine comprising a stator and a rotor including extending side flanges in planes perpendicular to the rotor axis, one of said flanges having a peripheral cam surface, said stator and rotor including between them means defining an expansion chamber having a movable wall thereof carried by said rotor for rotating the latter, means forming a supply for compressed expansible motive fluid, communicating with said expansion chamber, inlet and outlet valves for said expansive fluid supplying means, one controlling an inlet passage for the expansible fluid and the other controlling communication between said expansible fluid supplying means and said expansion chamber, said valves opening and closing in alternation, means for simultaneously operating said valves including a reciprocable element engaging said cam surface and controlled thereby.

10. Rotary internal combustion engine comprising a shaft, expansion units co-axial with said shaft and each including a stator, each unit having side plates constituting bearings for said shaft and a rotor for each unit fixed to the shaft, each rotor including extending side flanges in planes perpendicular to the rotor axis, said stator including a frame bridging the peripheral space between the side plates of said stator and a pair of peripheral rings, one slidably fitting within the other with a gas sealed joint and being expansible laterally against said flanges, at least one of said rings being recessed to form a channel between the adjacent faces of said rings, means for supporting said rings from said frame with freedom of lateral expansion, said rotor having a hub portion encompassed by said rings and forming with them an expansion chamber, a vane carried by said rotor having a narrow portion fitting within said channel and a wide portion fitting against said side flanges below said channel, an abutment carried by said stator cooperating with said rotor to divide the expansion from the exhaust chamber, means for rendering alternate units inactive by withdrawing the abutment and vane from cooperative relationship with the circumferential walls of their respective chambers.

ABRAM H. WOOD.